United States Patent
Pomerleau

(10) Patent No.: US 8,771,160 B2
(45) Date of Patent: Jul. 8, 2014

(54) GAS INJECTION-AIDED CENTRIFUGAL SEPARATION OF ENTRAINED SOLIDS FROM A SOLUTION

(75) Inventor: Daniel Guy Pomerleau, Calgary (CA)

(73) Assignee: F. P. Marangoni Inc., Calgary (CA)

(*) Notice: Subject to any disclaimer, the term of this patent is extended or adjusted under 35 U.S.C. 154(b) by 1010 days.

(21) Appl. No.: 12/864,474

(22) PCT Filed: Jan. 30, 2009

(86) PCT No.: PCT/CA2009/000113
§ 371 (c)(1),
(2), (4) Date: Sep. 23, 2010

(87) PCT Pub. No.: WO2009/094774
PCT Pub. Date: Aug. 6, 2009

(65) Prior Publication Data
US 2011/0009253 A1    Jan. 13, 2011

Related U.S. Application Data

(60) Provisional application No. 61/025,302, filed on Jan. 31, 2008.

(51) Int. Cl.
*B04B 1/20* (2006.01)
(52) U.S. Cl.
USPC .......... 494/25; 494/26; 494/37; 494/53
(58) Field of Classification Search
USPC .......... 494/23, 25–26, 37, 53–54, 56, 67; 210/360.1, 380.3
See application file for complete search history.

(56) References Cited

U.S. PATENT DOCUMENTS

| | | | | |
|---|---|---|---|---|
| 3,302,873 A | * | 2/1967 | Kowata | 494/27 |
| 3,795,361 A | * | 3/1974 | Lee | 494/26 |
| 3,885,734 A | * | 5/1975 | Lee | 494/25 |
| 4,299,352 A | * | 11/1981 | Erickson | 494/27 |
| 4,790,806 A | * | 12/1988 | High | 494/26 |
| 4,898,571 A | * | 2/1990 | Epper et al. | 494/26 |
| 5,176,616 A | * | 1/1993 | Schlip et al. | 494/37 |
| 5,244,451 A | * | 9/1993 | Retter | 494/37 |
| 5,771,601 A | | 6/1998 | Veal et al. | |
| 6,030,332 A | * | 2/2000 | Hensley | 494/53 |
| 8,444,541 B2 | * | 5/2013 | Horbach et al. | 494/10 |
| 2009/0045147 A1 | | 2/2009 | Schmid | |
| 2011/0009253 A1 | * | 1/2011 | Pomerleau | 494/23 |

FOREIGN PATENT DOCUMENTS

| | | | |
|---|---|---|---|
| CA | 2243328 | 8/1997 | |
| DE | 102006009200 | 8/2007 | |
| JP | 2006187754 | 7/2006 | |
| SU | 576123 | * 10/1977 | |
| WO | WO 2009094774 A1 | * 8/2009 | B04B 1/20 |

OTHER PUBLICATIONS

English translation of the description portion of SU576123. The patent document itself was cited by the Examiner in the Office Action dated Oct. 17, 2013.

* cited by examiner

*Primary Examiner* — Charles Cooley
(74) *Attorney, Agent, or Firm* — Hicks & Associates; Andrew R. Hicks; Mark P. Roach

(57) ABSTRACT

The present invention describes a centrifuge system and method for improving the separation of entrained solids from a solution. The system and method introduces compressed gas to a fluid containing entrained solids to reduce the density and viscosity of the fluid to promote the settling of particles within the solution.

8 Claims, 1 Drawing Sheet

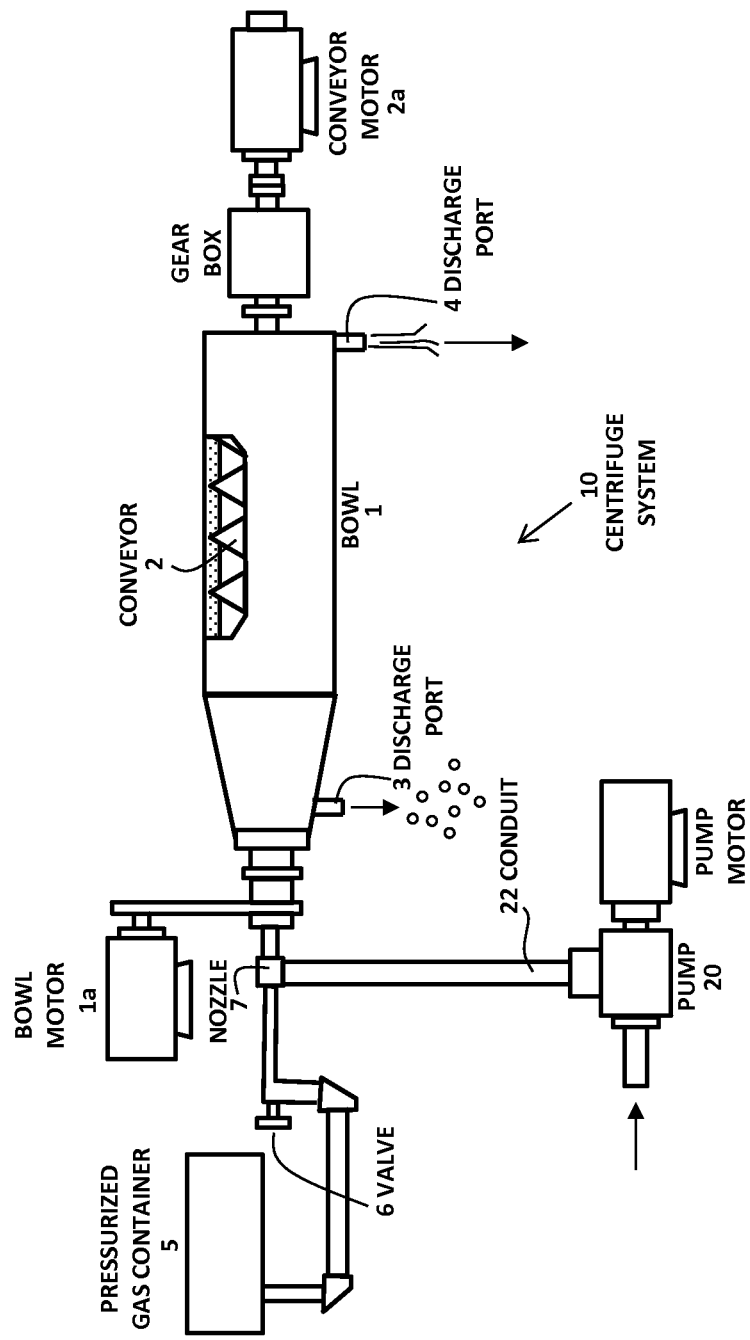

GAS INJECTION-AIDED CENTRIFUGAL SEPARATION OF ENTRAINED SOLIDS FROM A SOLUTION

FIELD OF THE INVENTION

The present invention describes a centrifuge system and method for improving the separation of entrained solids from a solution. The system and method introduces compressed gas to a fluid containing entrained solids to reduce the density and viscosity of the fluid to promote the settling of particles within the solution.

BACKGROUND OF THE INVENTION

It is known that centrifuges are effective in the removal of fine solids from solution. It is also known that dilution of a supporting fluid containing fine solids with a clean supporting fluid of the same type (i.e. free of fine solids) can be used reduce the viscosity and density of the fluid and improve the operational efficiency of the centrifuge. That is, by reducing the fluid viscosity, a higher proportion of fine solids may be removed from the supporting fluid. Unfortunately, while this method may result in an increase in the total amount of solids that may be removed from the supporting solution, the increase in the remaining volume of supporting fluid may or may not be beneficial.

In the case of drilling fluids used in hydrocarbon recovery, it is desirable to remove drill cuttings and fine solids from the drilling fluid as it is returned to the surface and prior to reintroduction downhole. This is normally accomplished by a combination of equipment including shakers and centrifuges. Normally, the shaker is employed to remove larger drill cuttings over a screen whereas a centrifuge is utilized to remove fine solids. The use and operation of the centrifuge will generally be dictated by the drilling fluid chemistry where the system operators will be seeking to either return the drilling fluid to a state similar to the original fluid or be adjusting the drilling fluid chemistry based on the drilling results. In other words, a drilling fluid is designed for a particular drilling program wherein management or control of parameters such as viscosity and fluid density are very important to the success of the drilling program. As fine solids become suspended within the drilling fluid, the chemistry affecting the viscosity of the fluid may change substantially. Accordingly, surface analysis of the drilling fluid is required to determine the most effective surface treatments to adjust the drilling fluid chemistry.

As a result, and depending on the drilling fluid, the centrifuge may be operated to maximize all solids removal or alternatively balance solids removal based on other drilling fluid parameters. For example, in an unweighted fluid, it may be desired to maximize fine solids removal in the centrifuge whereas with a weighted fluid, the use of the centrifuge may be balanced against maintaining the weighting agent in the fluid. Generally, centrifuges are operated to ensure that the total concentration of drilled solids in the drilling fluid is maintained at around or below 5% by volume.

A key problem in the operation of centrifuges with drilling fluids is the effect of fluid dilution. As noted above, a centrifuge may be made to be more efficient at fine solids removal by decreasing the viscosity of the fluid through the addition of a further volume of supporting fluid. However, this will result in an overall volume increase of the fluid which may then require additional treatment to re-adjust the viscosity to a desired degree. As drilling fluids, are highly expensive, there has been a need for a system and method of enhancing the removal of fine solids from drilling solutions without permanently affecting the viscosity or volume of the drilling fluid.

More specifically, there has been a need for a system and method for temporarily reducing the viscosity and density of fluid within a centrifuge such that the operational efficiency of the centrifuge is improved.

A review of the prior art reveals that such a system has not been developed in the past.

SUMMARY OF THE INVENTION

In accordance with the invention and with reference to the FIGURE a novel centrifuge and method of operating a centrifuge is described.

In accordance with a first embodiment, the invention provides a centrifuge for enhancing the separation of entrained solids within a solution comprising: a rotatable bowl for supporting a volume of fluid, the rotatable bowl operatively connected to an input port for introducing fluid to the rotatable bowl, a fluid discharge port for removing fluid from the rotatable bowl and a solids discharge port for removing solids from the rotatable bowl; a gas injection system operatively connected to the rotatable bowl for introducing a gas to the rotatable bowl and dispersing the gas within the rotatable bowl and liquid, the gas injection system being operable to adjust the density and viscosity of the fluid to enhance the centrifugal separation of the entrained solids from the solution during rotation of the rotatable bowl.

In a separate embodiment, the invention provides a method of separating entrained solids suspended within a drilling fluid solution comprising the steps of: introducing a drilling fluid containing entrained solids into a rotating centrifuge; injecting a gas within the drilling fluid and mixing the gas within the drilling fluid to lower the density and viscosity of the drilling fluid; operating the centrifuge to promote the settling of entrained solids from the drilling fluid; and separately removing separated solids and the drilling fluid from the centrifuge.

BRIEF DESCRIPTION OF THE DRAWINGS

The invention is described with reference to the FIGURE which is a schematic diagram of a centrifuge system in accordance with the invention.

DETAILED DESCRIPTION

With reference to the FIGURE, a centrifuge system 10 is described enabling improved separation of fine solids from a viscous supporting solution. The system is particularly effective in removing suspended fine solids from a drilling solution as used in the drilling industry. The system is described in the context of separating fine solids from a drilling solution (or drilling mud) although it is understood that the principles described herein may be applied to other centrifuge systems and solutions where it is desired to improve the efficiency of separation.

The centrifuge system 10 generally includes a bowl 1 for supporting a volume of drilling fluid and imparting a centrifugal force on the drilling fluid within the bowl, a screw conveyor 2 (with gear box and motor 2a) for moving separated fines to discharge port 3 and discharge port 4 for removing the drilling fluid from the bowl. The system also includes a pump motor and pump 20 for pumping drilling fluid into the bowl via conduit 22 and bowl motor 1a for rotating the bowl.

In accordance with the invention, the system further includes a compressor, blower or pressurized container 5 for providing a source of injectable gas (for example, air, carbon dioxide or nitrogen) through nozzle 7 into the drilling fluid. The injected gas is mixed with the drilling fluid at the pressure of the drilling fluid such that the injected gas produces bubbles within the slurry prior to the bowl to reduce both the density and viscosity of the fluid entering the centrifuge. The relative proportion of gas to liquid, the degree of mixing, the speed of rotation of the bowl and other parameters may be adjusted (for example by valve 6) to impart the appropriate properties on the drilling fluid to improve the centrifugal separation of fines from the drilling fluid.

Similar methodologies may be effectively used with other designs of centrifugal systems.

Settling Velocity Analysis

The settling velocity of a particle within a fluid is determined from Stokes equation wherein:

$$V_s = \frac{2}{9}\frac{r^2 g(\rho_p - \rho_f)}{\eta}$$

where:
- $V_s$ is a particle's settling velocity (m/s) (vertically downwards if $\rho p > \rho f$, upwards if $\rho_p < \rho f$),
- r is the Stokes radius of the particle (m),
- g is the standard gravity (m/s$^2$),
- $\rho_p$ is the density of the particles (kg/m$^3$),
- $\rho_f$ is the density of the fluid (kg/m$^3$), and
- $\eta$ is the fluid viscosity (Pa s).

Accordingly, by reducing the density of the fluids by the introduction of a dispersed gas within the fluid, the density of the fluid will be reduced such that the settling velocity will be increased. In addition, the introduction of a gas results in a reduction in fluid viscosity.

By analogy, this effect is confirmed by comparison to the case of diver entering a dive tank while a bubble system is turned on. A diver entering a dive pool with air bubbles being actively pumped through the water, enters water having a lower density. In order for the diver, after entering the water to be able to return to the surface, the bubble system must be turned off, otherwise the diver will want to "settle" towards the bottom of the pool. By a similar principle, entrained solids in a solution having gas bubbles being pumped thought the liquid will similarly settle more quickly.

Importantly, the method described herein does not result in an increase in fluid volume as the gas will not remain in the processed fluid as it will naturally be released from the fluid upon exposure to the atmosphere.

Testing

As summarized in Tables 1 and 2, initial aeration studies on Suncor Panther River 23 (Alberta, Canada) indicated that a 40% reduction in processed fluid weight density was achievable using nitrogen and carbon dioxide injection. Accordingly, this reduction in density predicts a 21% increase in $V_s$. In addition, a reduction in viscosity was also observed. An observed 33% reduction in viscosity predicts a 167% increase in $V_s$.

TABLE 1

Predicted Variation in Settling Velocity for Variable Fluid Density

| $\rho_p$ | $\rho_f$ | $\eta$ | $V_s$ | Var % |
|---|---|---|---|---|
| 2500 kg/m$^3$ | 1000 kg/m$^3$ | 10 Pa · s | 150 m/s | 0.00% |
| | 900 kg/m$^3$ | 10 Pa · s | 160 m/s | 6.67% |
| | 800 kg/m$^3$ | 10 Pa · s | 170 m/s | 13.33% |
| | 700 kg/m$^3$ | 10 Pa · s | 180 m/s | 20.00% |
| | 600 kg/m$^3$ | 10 Pa · s | 190 m/s | 26.67% |
| | 500 kg/m$^3$ | 10 Pa · s | 200 m/s | 33.33% |

TABLE 2

Predicted Variation in Settling Velocity for Variable Fluid Density and Viscosity

| $\rho_p$ | $\rho_f$ | $\eta$ | $V_s$ | Var % |
|---|---|---|---|---|
| 2500 kg/m$^3$ | 1000 kg/m$^3$ | 10 Pa · s | 150 m/s | 0% |
| | 900 kg/m$^3$ | 9.0 Pa · s | 178 m/s | 19% |
| | 800 kg/m$^3$ | 8.0 Pa · s | 213 m/s | 42% |
| | 700 kg/m$^3$ | 7.0 Pa · s | 257 m/s | 71% |
| | 600 kg/m$^3$ | 6.0 Pa · s | 317 m/s | 111% |
| | 500 kg/m$^3$ | 5.0 Pa · s | 400 m/s | 167% |

Different gases, including air, carbon dioxide and nitrogen may be introduced individually or in combination to impart different viscosity and density characteristics to the fluid. In addition, by controlling the temperature of the fluid the release of the gas from the liquid may be enhanced.

The invention claimed is:

1. A centrifuge for enhancing the separation of entrained solids within a solution comprising:
    a rotatable bowl for supporting a volume of fluid, the rotatable bowl operatively connected to an input port for introducing fluid to the rotatable bowl;
    a fluid discharge port for removing fluid from the rotatable bowl;
    a solids discharge port for removing solids from the rotatable bowl; and
    a gas injection system operatively connected to the rotatable bowl for introducing a gas into the solution prior to introduction of the solution to the rotatable bowl and dispersing the gas within the rotatable bowl and liquid, the gas injection system being operable to adjust the density and viscosity of the fluid to enhance the centrifugal separation of the entrained solids from the solution during rotation of the rotatable bowl, wherein the entry point of the solution into the rotatable bowl includes a nozzle operatively connected to a pump and to the gas injection system.

2. A centrifuge as in claim 1 wherein the centrifuge includes a screw conveyor to convey solids to the solids discharge port.

3. A centrifuge as in claim 1 wherein the gas injection system comprises a valve for adjusting a gas injection parameter, the valve operatively connected to the gas injection system and the nozzle for adjusting the gas injection parameter.

4. The centrifuge as in claim 3 wherein the gas injection parameter is the relative proportion of the gas to the solution or the degree of mixing of the gas with the solution.

5. A method of separating entrained solids suspended within a drilling fluid solution comprising the steps of:
    a. introducing a gas into drilling fluid containing the entrained solids, thereby lowering the density and viscosity of the drilling fluid;
    b. introducing the drilling fluid containing the gas and the entrained solids into a rotating centrifuge;

c. operating the centrifuge to promote settling of the entrained solids from the drilling fluid; and d. separately removing separated solids and the drilling fluid from the centrifuge.

6. The method of claim 5 wherein the entry point of the solution into the rotating centrifuge includes a nozzle operatively connected to a pump and to a gas injection system for introducing the gas in step a).

7. The method of claim 6 wherein the gas injection system comprises a valve for adjusting a gas injection parameter, the valve operatively connected to the gas injection system and the nozzle.

8. The method of claim 7 wherein the gas injection parameter is the relative proportion of the gas to the solution or the degree of mixing of the gas with the solution.

* * * * *